(12) United States Patent
Shindo

(10) Patent No.: US 6,838,848 B2
(45) Date of Patent: Jan. 4, 2005

(54) BRUSHLESS MOTOR CONTROL METHOD

(75) Inventor: Yoichi Shindo, Kiryu (JP)

(73) Assignee: Mitsuba Corporation, Gunma (JP)

( * ) Notice: Subject to any disclaimer, the term of this patent is extended or adjusted under 35 U.S.C. 154(b) by 0 days.

(21) Appl. No.: 10/447,234

(22) Filed: May 29, 2003

(65) Prior Publication Data

US 2003/0227271 A1 Dec. 11, 2003

(30) Foreign Application Priority Data

Jun. 7, 2002 (JP) ........................................ 2002-166998

(51) Int. Cl.7 .............................................. H02P 7/50
(52) U.S. Cl. ....................... 318/439; 318/254; 318/138; 318/432; 310/68 R; 310/66; 310/68 B
(58) Field of Search ................................ 318/254, 138, 318/439, 432; 310/66, 68 B, 68 R

(56) References Cited

U.S. PATENT DOCUMENTS 4,353,016 A * 10/1982 Born ........................... 318/254
5,418,416 A * 5/1995 Muller ......................... 310/186
5,444,341 A * 8/1995 Kneifel et al. ............... 318/432
6,249,067 B1 * 6/2001 Schob et al. ............... 310/68 B
6,407,524 B1 * 6/2002 Endo et al. .................. 318/432
6,552,453 B2 * 4/2003 Ohiwa et al. .............. 310/68 B

* cited by examiner

Primary Examiner—Rita Leykin
(74) Attorney, Agent, or Firm—Wenderoth, Lind & Ponack, L.L.P.

(57) ABSTRACT

Energization stages are formed by first and second sensor groups and a torque constant is defined for each of the stages. A target current value is computationally determined so as to drive a motor under control. As a torque command showing a target torque of the motor is input to the controller, the target current value is computationally determined for each stage according to a torque constant map, which provides a table of torque constants for different phases and different stages. The rotor angle of the motor is detected by Hall sensors and the current stage is computationally determined on the basis of the detected rotor angle. Then, a target current value is defined as a function of the target torque for each stage on the basis of the current stage and the motor is driven by the driver under PID control based on the target current value.

12 Claims, 10 Drawing Sheets

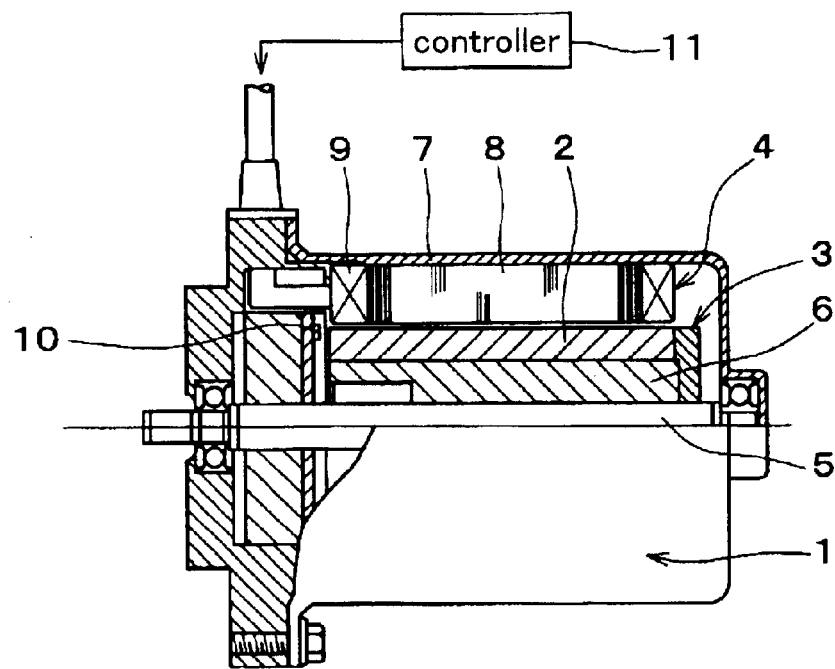
F I G. 1
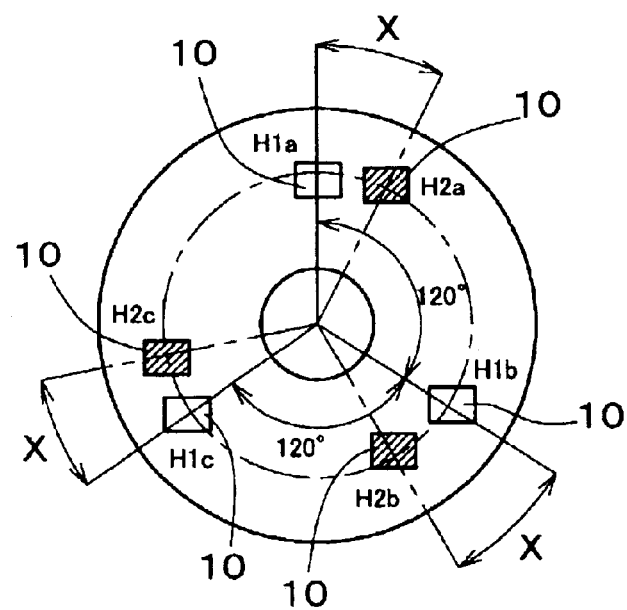
F I G. 2

| stage | ① | ② | ③ | ④ | ⑤ | ⑥ | ⑦ | ⑧ | ⑨ | ⑩ | ⑪ | ⑫ |
|---|---|---|---|---|---|---|---|---|---|---|---|---|
| torque constant U | KTU① | KTU② | KTU③ | KTU④ | KTU⑤ | KTU⑥ | KTU⑦ | KTU⑧ | KTU⑨ | KTU⑩ | KTU⑪ | KTU⑫ |
| torque constant V | KTV① | KTV② | KTV③ | KTV④ | KTV⑤ | KTV⑥ | KTV⑦ | KTV⑧ | KTV⑨ | KTV⑩ | KTV⑪ | KTV⑫ |
| torque constant W | KTW① | KTW② | KTW③ | KTW④ | KTW⑤ | KTW⑥ | KTW⑦ | KTW⑧ | KTW⑨ | KTW⑩ | KTW⑪ | KTW⑫ |
| electric current U | I①/2 | I② | I③ | I④ | I⑤/2 | 0 | -I⑦/2 | -I⑧ | -I⑨ | -I⑩ | -I⑪/2 | 0 |
| electric current V | -I① | -I② | -I③/2 | 0 | I⑤/2 | I⑥ | I⑦ | I⑧ | I⑨/2 | 0 | -I⑪/2 | -I⑫ |
| electric current W | I①/2 | 0 | -I③/2 | -I④ | -I⑤ | -I⑥ | -I⑦/2 | 0 | I⑨/2 | I⑩ | I⑪ | I⑫ |

FIG. 7

| stage | ① | ② | ③ | ④ | ⑤ | ⑥ | ⑦ | ⑧ | ⑨ | ⑩ | ⑪ | ⑫ |
|---|---|---|---|---|---|---|---|---|---|---|---|---|
| torque constant U | KTU① | KTU② | KTU③ | KTU④ | KTU⑤ | 0 | -KTU① | -KTU② | -KTU③ | -KTU④ | -KTU⑤ | 0 |
| torque constant V | -KTV⑦ | -KTV⑧ | -KTV⑨ | 0 | KTV⑤ | KTV⑥ | KTV⑦ | KTV⑧ | KTV⑨ | 0 | -KTV⑤ | -KTV⑥ |
| torque constant W | -KTW⑦ | 0 | KTW③ | KTW④ | KTW⑤ | KTW⑥ | KTW⑦ | 0 | -KTW③ | -KTW④ | -KTW⑤ | -KTW⑥ |
| electric current U | I①/2 | I② | I③ | I④ | I⑤/2 | 0 | -I①/2 | -I② | -I③ | -I④ | -I⑤/2 | 0 |
| electric current V | -I① | -I② | -I③/2 | 0 | I⑤/2 | I⑥ | I① | I② | I③/2 | 0 | -I⑤/2 | -I⑥ |
| electric current W | I①/2 | 0 | -I③/2 | -I④ | -I⑤ | -I⑥ | -I①/2 | 0 | I③/2 | I④ | I⑤ | I⑥ |

F I G. 8

| stage | ① | ② | ③ | ④ | ⑤ | ⑥ | ⑦ | ⑧ | ⑨ | ⑩ | ⑪ | ⑫ |
|---|---|---|---|---|---|---|---|---|---|---|---|---|
| torque constant U | KTU① | KTU② | KTU③ | KTU② | KTU① | 0 | -KTU① | -KTU② | -KTU③ | -KTU② | -KTU① | 0 |
| torque constant V | -KTV⑦ | -KTV⑥ | -KTV⑤ | 0 | KTV⑤ | KTV⑥ | KTV⑦ | KTV⑥ | KTV⑤ | 0 | -KTV⑤ | -KTV⑥ |
| torque constant W | -KTW③ | 0 | KTW③ | KTW④ | KTW⑤ | KTW④ | KTW③ | 0 | -KTW③ | -KTW④ | -KTW⑤ | -KTW④ |
| electric current U | I①/2 | I② | I③ | I④ | I⑤/2 | 0 | -I①/2 | -I② | -I③ | -I④ | -I⑤/2 | 0 |
| electric current V | -I① | -I② | -I③/2 | 0 | I⑤/2 | I⑥ | I① | I② | I③/2 | 0 | -I⑤/2 | -I⑥ |
| electric current W | I①/2 | 0 | -I③/2 | -I④ | -I⑤ | -I⑥ | -I①/2 | 0 | I③/2 | I④ | I⑤ | I⑥ |

F I G. 9

| stage | ① | ② | ③ | ④ | ⑤ | ⑥ | ⑦ | ⑧ | ⑨ | ⑩ | ⑪ | ⑫ |
|---|---|---|---|---|---|---|---|---|---|---|---|---|
| torque constant U | KTU① | KTU② | KTU③ | KTU② | KTU① | 0 | -KTU① | -KTU② | -KTU③ | -KTU② | -KTU① | 0 |
| torque constant V | -KTU③ | -KTU② | -KTU① | 0 | KTU① | KTU② | KTU③ | KTU② | KTU① | 0 | -KTU① | -KTU② |
| torque constant W | KTU① | 0 | -KTU① | -KTU② | -KTU③ | -KTU② | -KTU① | 0 | KTU① | KTU② | KTU③ | KTU② |
| electric current U | I①/2 | I② | I① | I② | I①/2 | 0 | -I①/2 | -I② | -I① | -I② | -I①/2 | 0 |
| electric current V | -I① | -I② | -I①/2 | 0 | I①/2 | I② | I① | I② | I①/2 | 0 | -I①/2 | -I② |
| electric current W | I①/2 | 0 | -I①/2 | -I② | -I① | -I② | -I①/2 | 0 | I①/2 | I② | I① | I② |

F I G. 10

BRUSHLESS MOTOR CONTROL METHOD

BACKGROUND OF THE INVENTION

1. Field of the Invention

This invention relates to a method of controlling a brushless motor. More particularly, the present invention relates to a technique that can be effectively applied to a brushless motor to be used for an electric power steering apparatus or an electronically controlled throttle valve.

2. Related Art Statement

Torque ripples have been an important problem that needs to be resolved. Torque ripples have to be reduced in order to achieve a low vibration level and a low noise emission level for brushless motors. For example, the motors that are used in electric power steering apparatuses are required to reduce the torque ripple because it adversely affects the feeling of the driver steering the automobile to a large extent. Similarly, the motors that are used in electronically controlled throttle valves of engines are required to reduce the torque ripple from the viewpoint of engine control because it influences the opening/closing operations of the throttle valve from the viewpoint of responsiveness. This problem is serious particularly when the valve is closing. Therefore, in such motors, the rotary position of the rotor is precisely detected by means of a resolver and the motor is made to revolve smoothly with a small torque ripple by means of sinusoidal wave drive.

However, when a resolver is used as unit in a brushless motor, it is expensive and a dedicated R/D converter (resolver signal/digital signal converter) has to be installed as interface with the corresponding control unit. Therefore, a motor using a resolver is accompanied by a problem of high cost of the entire system.

Thus, there is a demand for a system with a reduced torque ripple that can be obtained by using less expensive magnetic detection elements such as Hall elements as in the case of ordinary brushless motors so as to avoid the use of a resolver and an R/D converter. However, in the case of conventional systems for driving 3-phase brushless motors by using three magnetic detection elements, the accuracy of detection of the rotor position is poor and a rectangular drive mode has to be employed so that consequently it is difficult to reduce the torque ripple.

Thus, so-called overlapping energization is used in a brushless motor that is required to show a low vibration level and a low noise emission level as means for reducing the torque ripple while relying on 120° rectangular wave drive. Overlapping energization is a mode of electric energization in which a plurality of phases that are excited in the +or −direction are provided in an overlapping fashion for commutation. For example, when the U-phase is switched to the V-phase in a 3-phase motor, there is provided a time period during which the two phases are simultaneously energized to the same polarity (+or −). More specifically, in the above example, the energization of the V-phase in the +direction is started before the energization of the U-phase in the +direction is stopped so that the adjacent two phases are excited to the same polarity in an overlapping fashion in order to commutate from the U-phase to the V-phase.

With overlapping energization, the extent of overlapping is determined by the timing of energization of the next phase. The timing of energization of the next phase is by turn determined by estimating the rotor position by means of a timer or a piece of software on the basis of the information on the rotary position of the rotor obtained by the magnetic detection elements. With this arrangement, two phases are appropriately made to overlap each other and excited so that a phase is smoothly switched to another and it is possible to realize pseudo-sinusoidal wave drive. Therefore, it is possible to reduce the torque ripple by means of less costly magnetic detection elements without relying on a resolver and an R/D converter that are expensive.

However, in the case of an electric power steering apparatus or an electronically controlled throttle valve, forward revolutions and backward revolutions are switched from one to the other fiercely as the steering apparatus is operated or the throttle valve is opened or closed and the resultant acceleration changes greatly. Additionally, the steering operation and the accelerating operation can remarkably differ in individuals and some can steer and accelerate the car in a highly abrupt manner. Therefore, it is difficult to accurately predict the behavior of the motor. It is also difficult to predict the behavior of the motor when the motor speed is low and/or the motor is being accelerated. Thus, the rotary position of the rotor estimated by means of a timer or a piece of software can involve a large error and hence the overlapping energization cannot be conducted at appropriate timings.

In other words, overlapping energization is effective for motors that are being driven in a constant drive condition where the direction of revolution, the number of revolutions per unit time and the degree of acceleration scarcely change. However, it is difficult to adopt overlapping energization for electric power steering apparatuses and electronically controlled throttle valves. Therefore, a highly expensive resolver has to be used for such motors to raise the cost of the motor.

SUMMARY OF THE INVENTION

In view of the above identified circumstances, it is therefore an object of the present invention to reduce the torque ripple in a brushless motor whose driving direction is frequently switched from forward drive to backward drive and vice versa and whose acceleration can change to a large extent.

According to the present invention, the above object is achieved by providing a method of controlling a brushless motor comprising a stator having a multiphase armature coil, a rotor having a permanent magnet and arranged rotatably at the outside or inside of the stator, a first sensor group of a plurality of magnetic detection elements and a second sensor group having at least a magnetic detection element separated from the magnetic detection elements of the first sensor group by a predetermined gap, the method comprising: forming a plurality of energization stages corresponding to respective rotary positions of the rotor by means of the first sensor group and the second sensor group and defining a torque constant for each of the energization stages; and computationally determining a target electric current value for each of the energization stages on the basis of the torque constant and the target torque of each stage and supplying power to the armature coil on the basis of the target electric current value.

Thus, according to the invention, since energization stages are formed by means of the first and second sensor groups, defining a torque constant for each of the stages and a target current value is computationally determined for each of the stages so as to drive the motor under control, current value to obtain a target torque is set for each of the stages. With this arrangement, it is possible to suppress the torque ripple because inter-stage fluctuations of torque are minimized.

In a control method according to the invention, it may be so arranged that excitation phases of the same polarity are formed in an overlapping way for commutation on the basis of the outcome of the detection of rotary positions of the rotor by means of the first and second sensor groups. With this arrangement, the overlapping energization can be conducted without involving estimates while doubling the number of control stages. Therefore, the torque ripple can be reduced in an operating environment where forward revolutions and backward revolutions are switched from one to the other fiercely and the resultant acceleration changes greatly.

In a control method according to the invention, it may be so arranged that a torque constant is defined for each phase and each energization stage by using a map format. It is also possible to define a torque constant as a separate individual value for each of the energization stages or defined with the same value for some of the energization stages.

Furthermore, in a control method according to the invention, it may be so arranged that different target current values are selected respectively for energization stages having different numbers of excitation phases. Alternatively, the same value may be selected as the target current value for some of the energization stages or for energization stages having a same number of excitation phases.

Additionally, in a control method according to the invention, it may be so arranged that the target current value is used for feedback control by detecting the current value of each phase of the electric current being supplied to the armature coil. Alternatively, the target current value may be used for feedback control by computationally determining the current value of the electric current being supplied to the armature coil, using the number of revolutions per unit time of the rotor, the power supply voltage, the energization duty of the electric current supplied to the armature coil in each phase and the temperature of the armature coil.

Meanwhile, in a method of controlling a brushless motor according to the invention, the brushless motor may be a 3-phase brushless motor and twelve energization stages may be provided. Alternatively, the energization stages may include 3-phase energization stages for energizing a 3-phase armature coil and 2-phase energization stages for energizing a 2-phase armature coil.

The above-described and other objects, and novel feature of the present invention will become apparent more fully from the description of the following specification in conjunction with the accompanying drawings.

BRIEF DESCRIPTION OF THE DRAWINGS

FIG. 1 is a schematic illustration of an embodiment of a brushless motor according to the invention, showing its configuration.

FIG. 2 is a schematic illustration of a positional arrangement of Hall sensors.

In FIGS. 3A and 3B, the upper half shows the signal outputs of the Hall sensors and the lower half shows the waveforms of the voltages applied to the armature coil. FIG. 3A shows a control mode for forward revolutions and FIG. 3B shows a control mode for backward revolutions.

FIG. 7 is a schematic illustration of an example of a torque constant map showing a relationship between a torque constant and a current value of each phase and each stage.

FIG. 8 is a schematic illustration of a torque constant map obtained by simplifying the map of FIG. 7.

FIG. 9 is a schematic illustration of a torque constant map obtained by simplifying the map of FIG. 8.

FIG. 10 is a schematic illustration of a torque constant map obtained by simplifying the map of FIG. 9.

DESCRIPTION OF THE PREFERRED EMBODIMENT

Figure 3A:
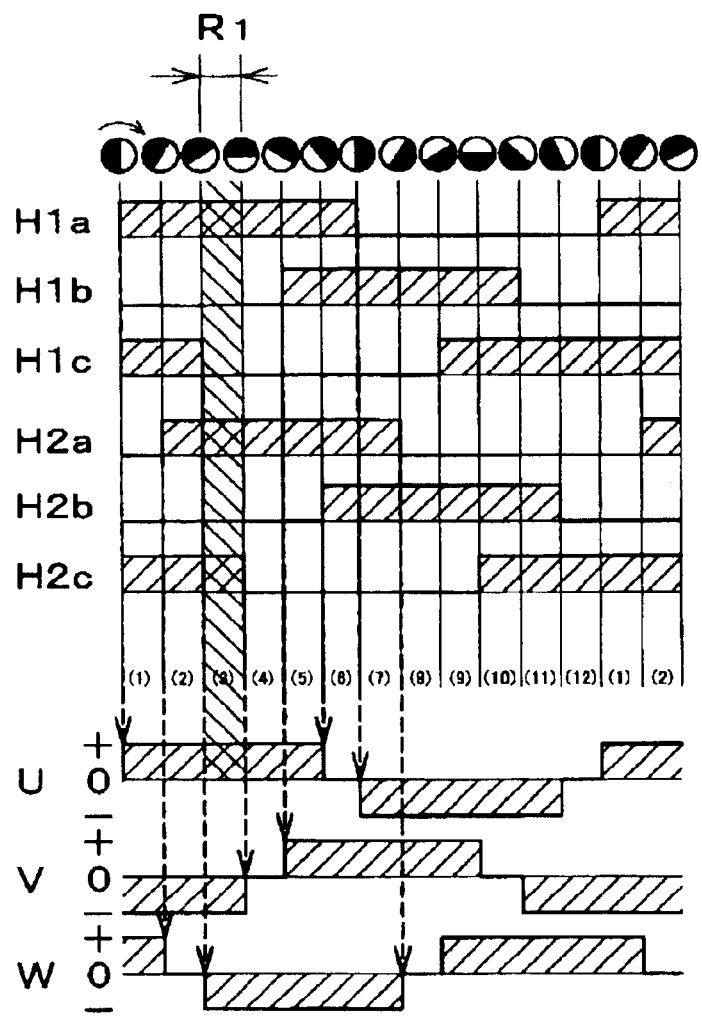
FIGS. 3A and 3B are timing charts illustrating a drive control mode of the brushless motor of FIG. 1 when an angle between each sensor of the sensor group H1 and the corresponding sensor of the sensor group H2 is defined to be equal to 30°.

Now, the present invention will be described by referring to the accompanying drawings that illustrate an embodiment of the invention. FIG. 1 is a schematic illustration of an embodiment of brushless motor 1 (to be referred to as motor 1 hereinafter) according to the invention, showing its configuration. The motor 1 is used as a drive source of an electric power steering apparatus. As shown in FIG. 1, the motor 1 has a configuration of that of an inner rotor type motor, in which a stator 4 is arranged around a rotor 3 having a rotor magnet 2 (permanent magnet to be referred to as magnet 2 hereinafter). As a driver operates a steering wheel, the motor 1 is driven under control in accordance with a steering angle, a driving speed of a vehicle and other factors and steering assistance force is supplied to a steering column by way of a reduction apparatus (not shown).

The rotor 3 has a rotor core 6 fitted to a metal shaft 5 and a bipolar magnet 2 rigidly secured to the outer periphery of the rotor core 6. The magnet 2 is divided into two segments, each taking 180° and made of a ferrite magnet. On the other hand, the stator 4 has a housing 7, a stator core 8 rigidly secured to the inner peripheral side of the housing 7 and an armature coil 9 wound around the teeth of the stator core 8. The armature coil 9 forms a coil having three phases of U, V and W.

Hall sensors (magnetic detection elements) 10 for detecting the rotary position of the rotor 3 by detecting the change in the magnetic poles of the magnet 2 are arranged in the housing 7. FIG. 2 is a schematic illustration of the positional arrangement of the Hall sensors 10. As shown in FIG. 2, two groups of sensors (sensor groups H1 and H2), each having three Hall sensors 10, are provided. The Hall sensors 10 of each group are arranged at regular angular intervals of 120° and the sensor group H1 (the first sensor group) includes Hall sensors H1a, H1b and H1c, whereas the sensor group H2 (the second sensor group) includes Hall sensors H2a, H2b and H2c. The Hall sensors H2a, H2b and H2c of the second sensor group H2 (the second sensor group) are separated from the corresponding respective Hall sensors H1a, H1b and H1c of the first sensor group H1 (the first sensor group) by a predetermined angular gap of X, the deviation angle X being defined within a range of electrical degree between 0 and 120°. The detection signals of the Hall sensors 10 are transmitted to controller (energization control means) 11 and the electric current to the armature coil 9 is appropriately switched according to the transmitted detection signals to form a revolving magnetic field for driving the rotor 3 to revolve.

Figure 3B:
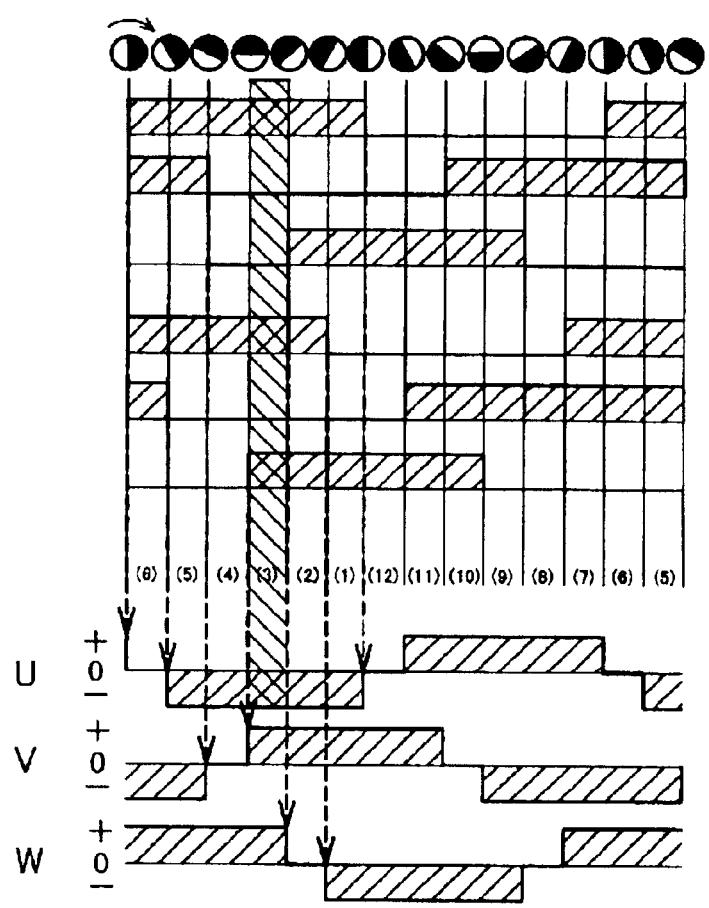

FIGS. 3A and 3B are timing charts illustrating the drive control mode of the motor 1 when the deviation angle from each sensor of the sensor group H1 to the corresponding sensor of the sensor group H2 is defined to be equal to 30°. In FIGS. 3A and 3B, the upper half shows the signal outputs of the Hall sensors 10 and the lower half shows the waveforms of the voltages applied to the armature coil 9. FIG. 3A is a control mode for forward revolutions and FIG. 3B is a control mode for backward revolutions. In FIG. 3, the half moon images shown at the top of the upper half of FIG. 3A schematically illustrate the positions of the rotor 3.

In the motor 1, when the rotor 3 is making a full turn, the control mode is divided into twelve energization stages (to be referred to simply as stages hereinafter) as shown in FIGS. 3A and 3B by referring to the rising edge (to be referred to as ON hereinafter) or the falling edge (to be referred to as OFF hereinafter) of any of the signals from the six Hall sensors H1a, H1b, H1c, H2a, H2b and H2c. In the instance of FIGS. 3A and 3B, at the time when the rotor 3 has revolved by 30° after the Hall sensor H1a (to be simply referred to as H1a and so will be all the other Hall sensors) became ON, H2a becomes ON. Then, H1c becomes OFF when the rotor 3 has revolved by an additional 30°. In this way, when X=30°, one of the Hall sensors becomes ON/OFF with an angular interval of 30° as the rotor 3 revolves so that twelve equal stages are formed. Since the motor 1 may revolve forwardly or backwardly, the center of the stage (3) is used as reference and arranged at the center of the U-phase magnetic pole as shaded in FIGS. 3A and 3B.

If the brushless motor is controlled by means of three Hall sensors without using the technique of overlapping energization, a cycle of 120° forward energization→60°, non-energization→120°, backward energization→60° non-energization is repeated for the coil in each phase. On the other hand, in the case of the motor 1, a cycle of 150° forward energization→30°, non-energization→150°, backward energization→30° non-energization is repeated for the armature coil 9 in each phase so that an energization period in a phase overlaps energization periods in other phases at initial and final time zones as shown in FIGS. 3A and 3B. In other words, overlapping energization is conducted for the motor 1 to an extent of overlapping of R1. This mode of controlling the motor 1 will be described in detail below by referring to FIGS. 3A and 3B.

Firstly, as the N pole of the rotor 3 gets to H1a and hence H1a becomes ON for forward revolutions, the U-phase is subjected to energization. At this time, +energization continues in the W-phase because H1c is ON as shown in FIG. 3A so that overlapping energization takes place for the switch from the W-phase to the U-phase. The state of overlapping energization of the same polarity continues until the N-pole of the rotor 3 revolves by 30° and H2a becomes ON (stage (1)). In other words, for forward revolutions, the overlapping time is controlled by H2a, H2b and H2c while the rotary position of the rotor 3 is detected by H1a, H1b and H1c. On the other hand, in the stages (1) and (2), only the V-phase is subjected to −energization. Thus, the U- and W-phases are subjected to +energization and the V-phase is subjected to −energization in the stage (1), whereas the U-phase is subjected to +energization and the V-phase is subjected to −energization in the stage (2).

As the rotor 3 revolves further to move into the stage (3), H1c becomes OFF and the W-phase is subjected to −energization. At this time, the −energization in the V-phase is continued so that the negative overlapping energization is continued until H2c becomes OFF. Then, as H2c becomes OFF and the V-phase comes into a non-energization state to move into the stage (4), the U-phase is subjected to +energization and the W-phase is subjected to −energization.

As H1b becomes ON to move into the stage (5), the V-phase is subjected to +energization. At this time, +energization continues in the U-phase so that the positive overlapping energization is continued until H2b becomes ON. Thereafter, as H2b becomes ON, the U-phase comes into a non-energization state while the V-phase is subjected to +energization and the W-Phase is subjected to −energization (the stage (6)) so that the phase of +energization is switched from the U-phase to the V-phase. Thereafter, the state of energization of each phase is switched in response to ON/OFF of each of the Hall sensors H1a through H2c to drive the rotor 3 to revolve forwardly.

On the other hand, when driving the rotor to revolve backwardly, the control operation is performed with inverted polarities of the applied voltages as shown in FIG. 3B. More specifically, for backward revolutions, the overlapping time is controlled by H1a, H1b and H1c while the rotary position of the rotor 3 is detected by H2a, H2b and H2c. As H1a becomes ON in the stage (6), the U-phase is put into a non-energization state and, at this time, the W-phase and the V-phase are subjected respectively to +energization and −energization. Then, as the rotor 3 revolves to come into the stage (5), H2b becomes OFF and the U-phase is subjected to −energization. At this time, −energization continues in the V-phase (the stage (9)) as a result of that H2c becomes OFF so that negative overlapping energization is in place. This state is maintained until the rotor 3 further revolves by 30° and H1b becomes OFF.

In the stage (4), the V-phase comes into a non-energization state and the W-phase is subjected to +energization, whereas the U-phase is subjected to −energization. In the stage (3), the V-phase is subjected to +energization as H2c becomes ON. At this time, the +energization in the W-phase is continued and the positive overlapping energization is continued until the H1c becomes ON. As the stage (2) starts, the W-phase comes into a non-energization state and the V-phase is subjected to +energization, whereas the U-phase is subjected to −energization so that the phase of +energization is switched from the W-phase to the V-phase. In the stage (1), the W-phase is subjected to −energization as H2a becomes OFF. At this time, the −energization in the U-phase is continued and the negative overlapping energization is continued until the H1b becomes OFF. Thereafter, the state of energization of each phase is switched in response to ON/OFF of each of the Hall sensors H1a through H2c to drive the rotor 3 to revolve backwardly.

In this way, for the motor 1, overlapping energization takes place and phases are switched in the odd-numbered stages. In other words, commutation takes place in the odd-numbered stages. Thus, commutation does not takes place fiercely as in the case of the energization method where energizing phases are switched without overlapping but smoothly so that it is possible to reduce the torque ripple. Additionally, the control mode that normally has only six stages can be made to have twelve stages without involving any estimation so that the accuracy of detection of the position of the rotor is improved. Therefore, according to the invention, overlapping energization can be employed in an environment where forward revolutions and backward revolutions are switched from one to the other fiercely and the resultant acceleration changes greatly as in the case of electric power steering apparatuses. As a result, it is possible to drive a brushless motor under control by means of less costly Hall sensors without relying on a resolver and an R/D converter that are expensive.

Figure 4:
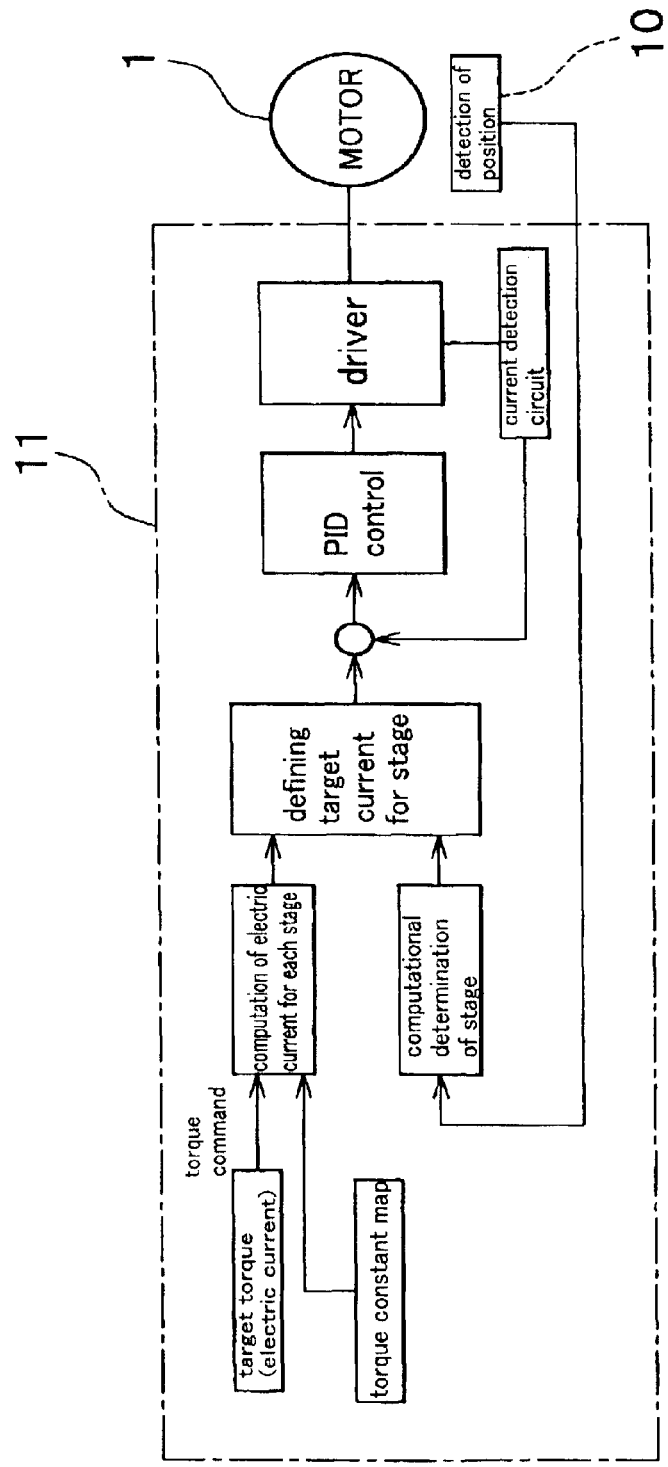
FIG. 4 is a schematic block diagram of a motor control mode of a controller of FIG. 1.

On the other hand, a target current value is defined for each stage in response to a torque command in order to drive the rotor 3 of the motor 1 to revolve. FIG. 4 is a schematic block diagram of a motor control mode of the controller 11. Referring to FIG. 4, firstly as a torque command showing a target torque of the motor 1 is input to the controller 11, the target current value is computationally determined for each stage according to a torque constant map. As will be described hereinafter, a table of torque constants is provided for different phases and different stages in the torque constant map.

As pointed out earlier, the rotor angle of the motor 1 is detected by the Hall sensors 10 and the current stage is computationally determined on the basis of the detected rotor angle. Then, a target current value is defined for the computationally determined stage and the motor 1 is driven by the driver under PID control. The electric current being supplied to the motor 1 is monitored by a current detection circuit and, with PID control, the P term (proportional), the I term (integral) and the D term (differential) are defined on the basis of the detected current value. The terms are multiplied by predetermined respective gain constants to determine the energization duty of the motor, which is fed back to control the electric current being supplied to the motor 1.

Figure 5:
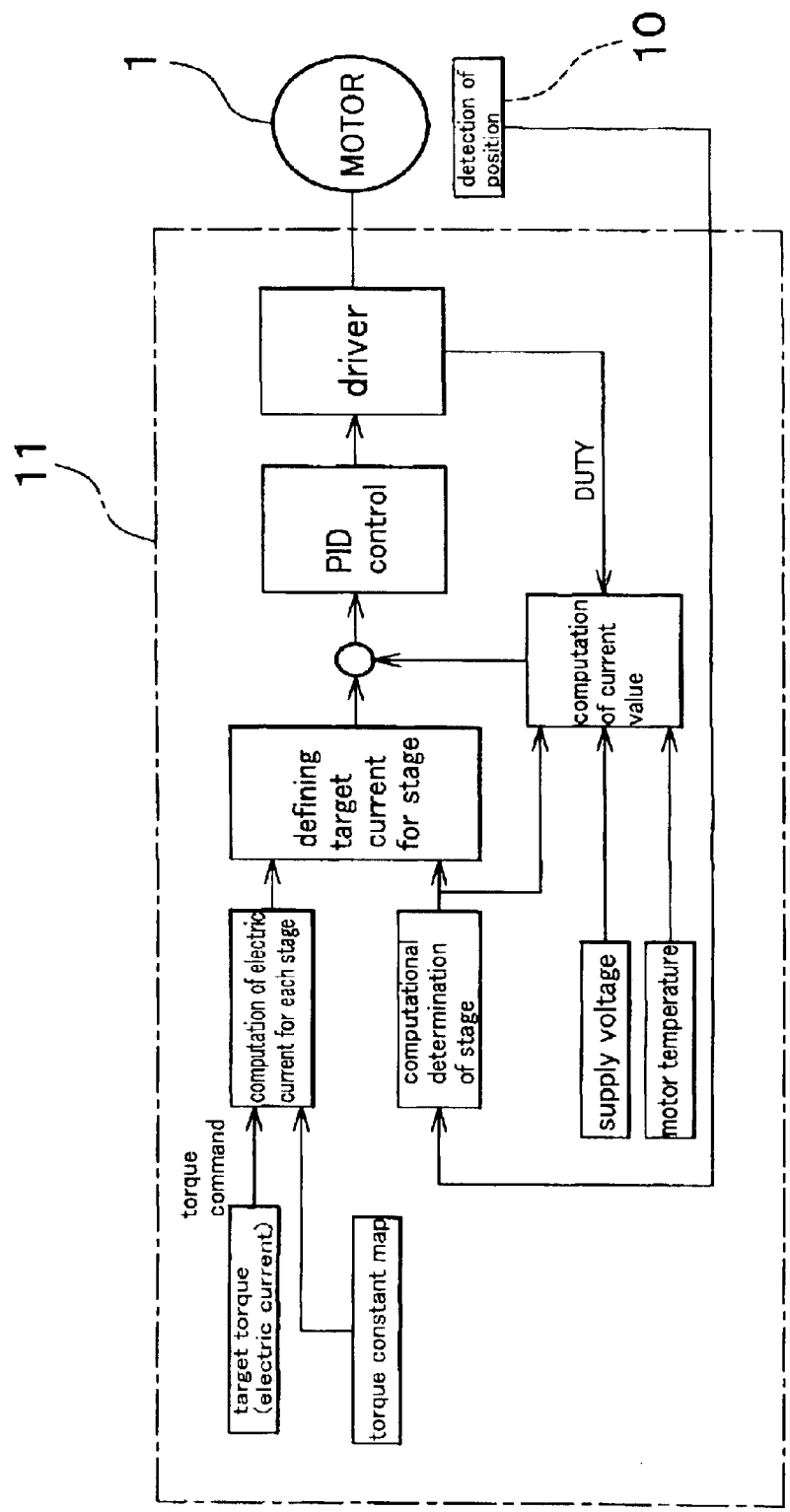
FIG. 5 is a schematic block diagram of an alternative motor control mode of the controller of FIG. 1.

The value of the electric current being supplied to the motor can be computationally determined for PID control by using the number of revolutions per unit time of the motor, the duty of the motor, the supply voltage and the motor temperature in place of the current detection circuit. FIG. 5 is a schematic block diagram of an alternative modified motor control mode of the controller. Referring to FIG. 5, the motor 1 operates as electric generator when the rotor 3 revolves. The voltage of the generated electricity is expressed by E=KT×ω, where KT is the induced voltage constant and ω is the number of revolutions per unit time of the rotor. On the other hand, the voltage V applied to the motor 1 is expressed by V=VB×duty, where VB is the supply voltage. Therefore, the electric current I flowing through the motor is expressed by I=(V−E)/R=(VB×duty−KT×ω)/R, where R is the electric resistance of the armature coil 9. The electric resistance of the armature coil 9 varies as a function of temperature. If the rate of change of the resistance per 1° C. is ΔR and the resistance at 0° C. is $R_0$, the resistance R at temperature of Temp° C. is expressed by R=$R_0$+ΔR×Temp. Therefore, the electric current I is expressed by I=(VB×duty−KT×ω)/(R+ΔR×Temp). Thus, the electric current being supplied to the motor 1 can be estimated by monitoring the number of revolutions per unit time of the motor, the duty of the motor, the supply voltage and the temperature of the motor so that, as in the case of FIG. 4, the electric current being supplied to the motor 1 can be controlled on the basis of the target current value defined for each stage and by feeding back the computationally determined current value.

As described above, the controller 11 computationally determines the target electric current to be supplied to the motor for each stage on the basis of the target torque. The motor torque $T_M$ can be expressed by the formula of (torque constant×electric current value). In the case of a 3-phase motor 1, if the torque constants for the respective phases are $K_{TU}$, $K_{TV}$ and $K_{TW}$ and the electric current values for the respective phases are $I_U$, $I_V$ and $I_W$, the motor torque $T_M$ is expressed by the formula below (formula (1)).

$$T_M = K_{TU}I_U + K_{TV}I_V + K_{TW}I_W \qquad (1)$$

Meanwhile, if the induced voltages of the respective phases for a given number of revolutions per unit time ω are $E_U$, $E_V$ and $E_W$ respectively, the induced voltage constants $K_{EU}$, $K_{EV}$ and $K_{EW}$ of the respective phases are expressed by the following formulas (formulas (2)).

$$K_{EU} = E_U/\omega \qquad (2)$$
$$K_{EV} = E_V/\omega$$
$$K_{EW} = E_W/\omega$$

Figure 6:
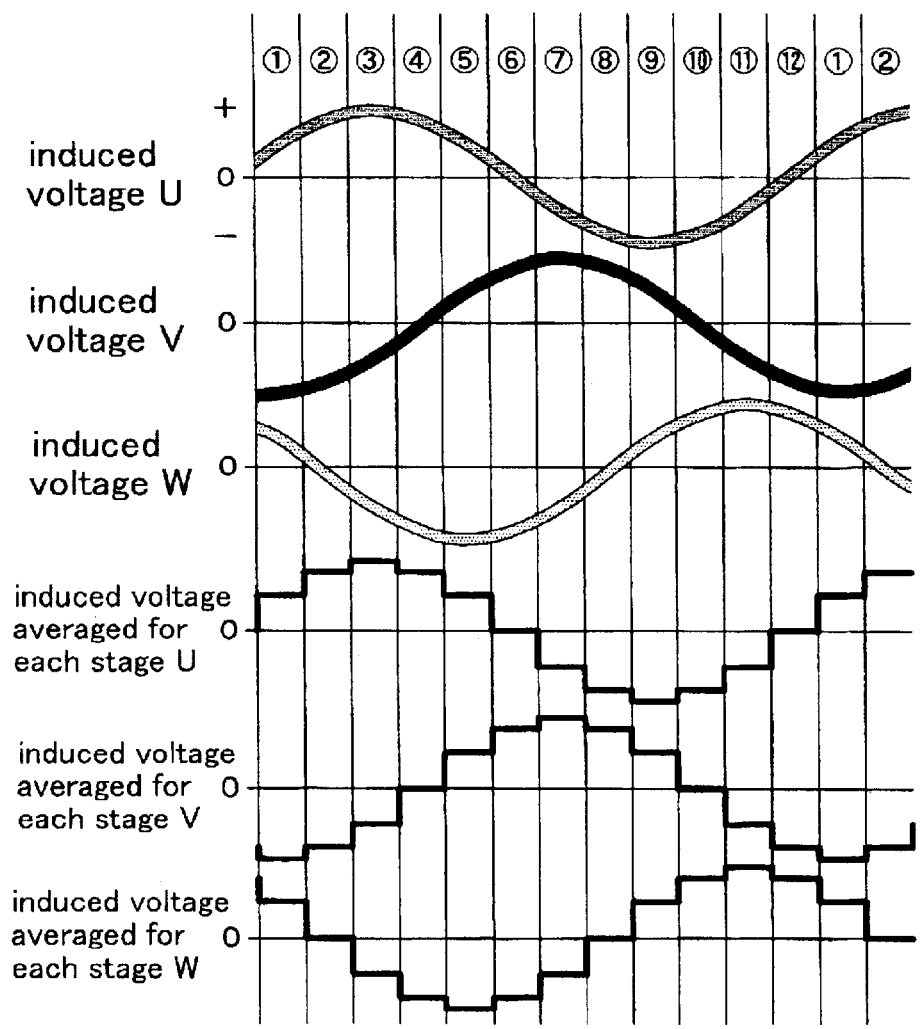
FIG. 6 is a schematic illustration of changes of inducted voltages in different phases of the brushless motor of FIG. 1 and induced voltages averaged for each stage.

FIG. 6 is a schematic illustration of the changes of the induced voltages in the different phases of the brushless motor and the induced voltages as averaged for each stage of the drive operation of the motor. Since the induced voltage constant and the torque constant are identical for the motor, the torque constant shows a waveform the same as that of the induced voltage in each phase. In other words, the torque constant changes in a manner as shown in FIG. 6 in each phase. Since the induced voltage is measurable, it is possible to know the relationship between the electrical degree and the torque constant in each phase by observing the induced voltage in advance. The controller 11 of the motor 1 determines the relationship for each stage in advance by using the corresponding average value as shown in FIG. 6 and holds it in a map.

FIG. 7 is a schematic illustration of an example of a torque constant map showing the relationship between the torque constant and the current value of each phase and each stage. In the motor 1, the odd-numbered stages are 3-phase energization stages for energizing all the three phases of the armature coils 9, whereas the even-numbered stages are 2-phase energization stages for energizing two phases of the armature coil 9. The sum of all the electric currents for the three phases is equal to 0 in each energization stage. Therefore, the electric current values I(1), I(2), ..., I(12) of the stages are such as those shown in FIG. 7. If the torque constants of the phases for each of the stages (1) through (12) are KTU(n), KTV(n) and KTW(n), the torque equation (1) is expressed by the formula below for the stage (1). If the equation is solved for I, it is expressed by the next formula below. Note that the number of stage is encircled in the related figures and formulas.

$$T = \frac{KTU\,①}{2}I\,① - KTV\,①I\,① + \frac{KTW\,①}{2}I\,① = \left(\frac{KTU\,① + KTW\,①}{2} - KTV\,①\right)I\,①$$

$$I\,① = \frac{T}{\left(\frac{KTU\,① + KTW\,①}{2} - KTV\,①\right)}$$

Similarly, the current values I(3), I(5), I(7), I(9), I(11) for the odd-numbered stages are expressed by the formulas (3) and the current values I(2), I(4), I(6), I(8), I(10), I(12) for the even-numbered stages are expressed by the formulas (4) below.

$$I(3) = \frac{T}{\left(KTU(3) - \frac{KTV(3) + KTW(3)}{2}\right)}$$

$$I(5) = \frac{T}{\left(\frac{KTU(5) + KTV(5)}{2} - KTW(5)\right)}$$

$$I(7) = \frac{T}{\left(KTV(7) - \frac{KTU(7) + KTW(7)}{2}\right)}$$

$$I(9) = \frac{T}{\left(\frac{KTV(9) + KTW(9)}{2} - KTU(9)\right)}$$

$$I(11) = \frac{T}{\left(KTW(11) - \frac{KTU(11) + KTV(11)}{2}\right)}$$

$$I(2) = \frac{T}{KTU(2) - KTV(2)} \quad (4)$$

$$I(4) = \frac{T}{KTU(4) - KTW(4)}$$

$$I(6) = \frac{T}{KTV(6) - KTW(6)}$$

$$I(8) = \frac{T}{KTV(8) - KTU(8)}$$

$$I(10) = \frac{T}{KTW(10) - KTU(10)}$$

$$I(12) = \frac{T}{KTW(12) - KTV(2)}$$

In this way, the controller 11 computationally determines the target current value for each stage in response to the torque command (target torque T) using the formulas to control the operation of driving the motor 1 by having a map of torque constants prepared for each stage. In other words, in the motor 1, the electric current value necessary for obtaining the target torque is computed for each stage on a real time basis. Thus, if the number of phases to be energized differs from stage to stage, the motor 1 is driven to operate with a minimal torque ripple.

Meanwhile, as may be seen from the graph of induced voltages shown in FIG. 6, symmetric waveforms appear periodically for the torque constants KTU, KTV, and KTW in an ideal condition. Therefore, it is not necessary for defining twelve torque constants for each phase in each stage. In other words, it is possible to do with a reduced number of torque constants by utilizing the waveform. The map of FIG. 8 is obtained by simplifying the map of FIG. 7, taking the fact that torque constants are point symmetric relative to the 0 level into consideration. In FIG. 7, the absolute values of KTU (1) through (5) in the U-phase are same as those of KTU(7) through (12) although the signs are opposite relative to each other. This relationship also holds true in the V- and W-phases. Furthermore, in the U-phase, the electric current value in the stages (6) and (12) are equal to 0 and hence the torque constant is also equal to 0. Thus, considering these, it is possible to reduce the number of torque constants KTU, KTV and KTW to six for each phase including KTU(1) through (5) and 0 as shown in FIG. 8. Accordingly, the target current values for the stages (1) through (6) are same as those for the stages (7) through (12) (with an opposite sign).

Considering that the torque constants are point symmetric relative to each point of inflection, the map shown in FIG. 8 can be simplified further. FIG. 9 schematically illustrates such a further simplified map. As seen from FIG. 6, KTU(4) and (5) have values same as KTU (1) and (2). The same statement can be made also for the V-phase and the W-phase. Therefore, the torque constants KTU, KTV and KTW are simplified and reduced to KTU(1) through (3) and 0 as shown in FIG. 9.

Furthermore, as seen from FIG. 6, the torque constants of different phases are displaced from each other. More specifically, a torque constant in a phase is same as the torque constant for the position displaced by 120° in another phase. For example, KTU(1) and KTV(5) show the same value. Thus, the map shown in FIG. 10 is obtained by simplifying the map of FIG. 9. The torque constants KTU, KTV and KTW are simplified and reduced to KTU(1) through (3) and 0 as shown in FIG. 10 as a result of taking the inter-phase differences into consideration. Additionally, for example in the stage (3), the formula for the torque is expressed by T=KTU(1)/2·I(3)+KTU(3)·I(3)+KTU(1)/2·I (3)=(KTU(1)+KTU(3))·I(3). When the equation is solved for I(3), I(3)=T/(KTU(1)+KTU(3)) is obtained. The right side of this equation is identical with the right side of the equation (5) below and hence all the other current values I(3), I(5), I(7), I(9) and I(11) of the other odd-numbered stages are equal to I(1). By similarly solving the equation for the even-numbered staged, I(2)=I(4)=···=I(12) is obtained. Therefore, the simplified map of FIG. 10 is obtained for the controller 11 and the torque is expressed by the formula below for the odd-numbered stages.

$$T = \frac{KTU(1)}{2} Ia + KTU(3) Ia + \frac{KTU(1)}{2} Ia = (KTU(1) + KTU(3)) Ia$$

By solving the above equation for I(1), the formula (5) below is obtained. Similarly, the formula (6) below is obtained by solving the above equation for I(2) for the even-numbered stages.

$$I(1) = \frac{T}{KTU(1) + KTU(3)} \quad (5)$$

$$I(2) = \frac{T}{2 \times KTU(2)} \quad (6)$$

Thus, in the case of FIG. 10, the value of the electric current to be supplied in each phase for outputting torque T is equal to ±I(1) or ±I(1)/2 in the odd-numbered stages where the armature coil 1 is energized in all the three phases and equal to ±I(2) or ±I(2)/2 in the even-numbered stages where the armature coil 1 is energized in two phases. Therefore, the torque ripple of the motor 1 can be reduced when the PID control is conducted in such a way that the electric current supplied to the armature coil 9 takes such values. Note that the electric current values I(1) and I(2) are computationally obtained from T and KTU(1) through (3) by using the equations (5) and (6). Thus, the torque ripple can be reduced and controlled by simply having three constants of KTU(1) through (3) for the motor 1 and hence the memory of the controller 11 can be used economically.

As a result of certain experiments conducted by the inventors of the present invention, it was found that a remarkable effect of reducing the torque ripple is achieved when a waveform obtained by adding high harmonics of the 11-th degree to a pure sinusoidal wave by 0.015 is used as induced voltage waveform. Particularly, in the case of a motor with a deviation angle of 30°, the torque ripple reduction effect was maximized and the torque ripple could be suppressed to about 2% when the ratio of the electric current in the period of 2-phase energization (even-numbered stage) to the electric current in the period of 3-phase energization (odd-numbered stage) was held to 100:86. In other words, the torque ripple reduction effect is maximized when I(1) is defined to be 86% of I(2). Bearing this in mind, I(1) can be defined by using a formula of the equation (6)×0.86 and it is sufficient to use the torque constant of KTU(2).

Additionally, it was also confirmed that the motor 1 could be driven by using a waveform obtained by adding higher harmonics to a sinusoidal wave as a result of the above experiments. Therefore, it is also possible to drive the motor by means of a combination of the use of a sinusoidal wave in regions where the rotor position can be estimated with ease particularly when the rotor is revolving at high speed and the use of a map such as the above described one in regions where the rotor position can hardly be estimated.

Detailed description has hereinabove been given of the invention achieved by the present inventor with reference to the embodiment. However, the present invention should not be limited to the embodiment described above, and may be variously modified within the scope not departing from the gist.

For example, the above described embodiment represents application of the present invention to a 3-phase brushless motor, it is also possible to apply the present invention to other multi-phase brushless motors such as a 5-phase brushless motor having phases of U, V, W, X and Y. Additionally, while the deviation angle X is defined to be equal to 30° in the above embodiment, it is by no means limited to 30° and, if appropriate, can take any value such as 10°, 20° or 50°, for instance. It should be noted that it is not necessary to define the deviation angle by a single value. In other words, different deviation angles may be adopted to some or all of the Hall sensors.

While the above described embodiment comprises two sensor groups (H1, H2), a brushless motor to which the present invention is applicable may alternatively have three or more than three sensor groups. Furthermore, while the second sensor group H2 of the above described embodiment has three Hall sensors, it may alternatively have only a single Hall sensor. In other words, the second sensor group H2 may have any number of Hall sensors including one. While the magnet 2 of the above described embodiment is equally divided into two poles, it may alternatively be so arranged that the angles of the magnetic poles are differentiated or the magnet is made to have more than two poles and the magnetizing pattern of the magnet shows different pitches. For example, the number of Hall sensors of the second sensor group H2 can be reduced by using such a modified mode of magnetization. It is also possible to make the first sensor group H1 have two Hall sensors. Alternatively, the numbers of Hall sensors of the first and second sensor groups H1 and H2 may be two and one or two and two.

While the above described motor 1 is an inner rotor type brushless motor, the present invention is also applicable to an outer rotor type brushless motor. The present invention is further applicable to a brushless motor that does not revolve forwardly and backwardly but revolves only in one direction. In the case of such a motor, the lead angle can be controlled by providing an appropriate angle between the center of the stage (3) and that of the U-phase magnetic pole.

Meanwhile, although the above described embodiment represents application of the present invention to a column-assist type electric power steering apparatus, the present invention is also applicable to an electric power steering apparatus of some other type such as rack-assist type.

Furthermore, the present invention can be applied not only to electric power steering apparatuses but also to electronically controlled throttle valves of engines as disclosed in Japanese Patent Applications Laid-Open Publication Nos. 10-184401 and 10-252510. Then, overlapping energization can be employed in an operating environment where forward revolutions and backward revolutions of the motor are switched from one to the other fiercely and the resultant acceleration changes greatly as in the case of operation of an electronically controlled throttle valve. Thus, the brushless motor of an electrically controlled throttle value can be controlled for operation simply by using Hall sensors without relying on a resolver and an R/D converter that are expensive so that the cost of the final product can be reduced without sacrificing the control responsiveness of the engine.

The scope of application of the present invention is not limited to brushless motors of electric power steering apparatuses and electronically controlled throttle valves. In other words, the present invention has a broader scope of application including various industrial machines such as intelligent robots and IT equipment such as personal computers.

As described above in detail, according to the invention, energization stages are formed by means of the first and second sensor groups and a target current value is computationally determined in order to obtain a target torque for each of the energization stages so as to drive the motor under control. With this arrangement, if the number of energized phases is different from stage to stage, it is possible to suppress the torque ripple because inter-stage fluctuations of torque are mimized.

What is claimed is:

1. A method of controlling a brushless motor comprising a stator having a multiphase armature coil, a rotor having a permanent magnet and arranged rotatably at the outside or inside of said stator, a first sensor group of a plurality of magnetic detection elements and a second sensor group having at least a magnetic detection element separated from said magnetic detection elements of said first sensor group by a predetermined gap, the method comprising:

forming a plurality of energization stages corresponding to respective rotary positions of said rotor by means of said first sensor group and said second sensor group and defining a torque constant for each of said energization stages; and computationally determining a target electric current value for each of said energization stages on the basis of said torque constant and the target torque of each stage and supplying power to said armature coil on the basis of said target electric current value.

2. The method according to claim 1, wherein excitation phases of the same polarity are formed in an overlapping way for commutation on the basis of the outcome of the detection of rotary positions of said rotor by means of said first and second sensor groups.

3. The method according to claim 1, wherein said torque constant is defined for each phase and each energization stage by using a map format.

4. The method according to claim 3, wherein said torque constant is defined as a separate individual value for each of the energization stages.

5. The method according to claim 3, wherein said torque constant is defined with the same value for some of the energization stages.

6. The method according to claim 1, wherein different target current values are selected respectively for energization stages having different numbers of excitation phases.

7. The method according to claim 1, wherein
a same value is selected as the target current value for some of said energization stages.

8. The method according to claim 1, wherein
a same value is selected as the target current value for energization stages having the same number of excitation phases.

9. The method according to claim 1, wherein
the target current value is used for feedback control by detecting the current value of each phase of the electric current being supplied to said armature coil.

10. The method according to claim 1, wherein the target current value is used for feedback control by computationally determining the current value of the electric current being supplied to said armature coil, using the number of revolutions per unit time of said rotor, the power supply voltage, the energization duty of the electric current supplied to said armature coil in each phase and the temperature of said armature coil.

11. The method according to claim 1, wherein
said brushless motor is a 3-phase brushless motor and twelve energization stages are provided.

12. The method according to claim 11, wherein said energization stages include 3-phase energization stages for energizing a 3-phase armature coil and 2-phase energization stages for energizing a 2-phase armature coil.

* * * * *